| Time in seconds | 0 MOLD OPEN | 1 MOLD CLOSED | 2 | 3 | 4 | 5 MOLD CLOSED | 6 MOLD OPEN | 7 | 0 MOLD OPEN |
|---|---|---|---|---|---|---|---|---|---|
| FIRST STATION INJECTION | MOLD | CLAMP PRESSURE BUILD UP | INJECTION | | CURE PERIOD | MOLD | TURRET | | DELAY |
| SECOND STATION BLOWING | CLOSING | CAM DOWN | AIR PRESSURE THROUGH HOSE 36a | | | OPENING | CAM UP | ROTATES | |
| THIRD STATION BLOWING | | | | | | | | | |
| FOURTH STATION EJECTION | | NECK RING MOLD OPEN | | | | | | | |
| | | AIR PRESSURE THROUGH HOSE 26a | | | | | | | |

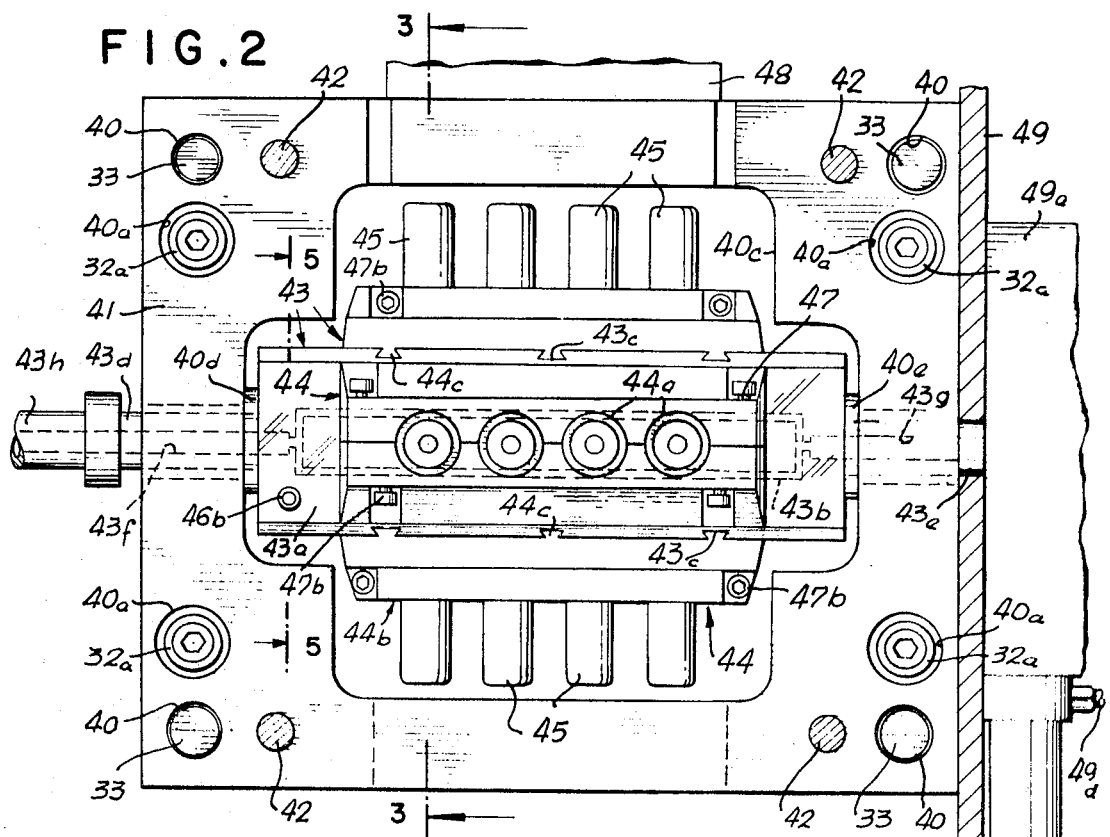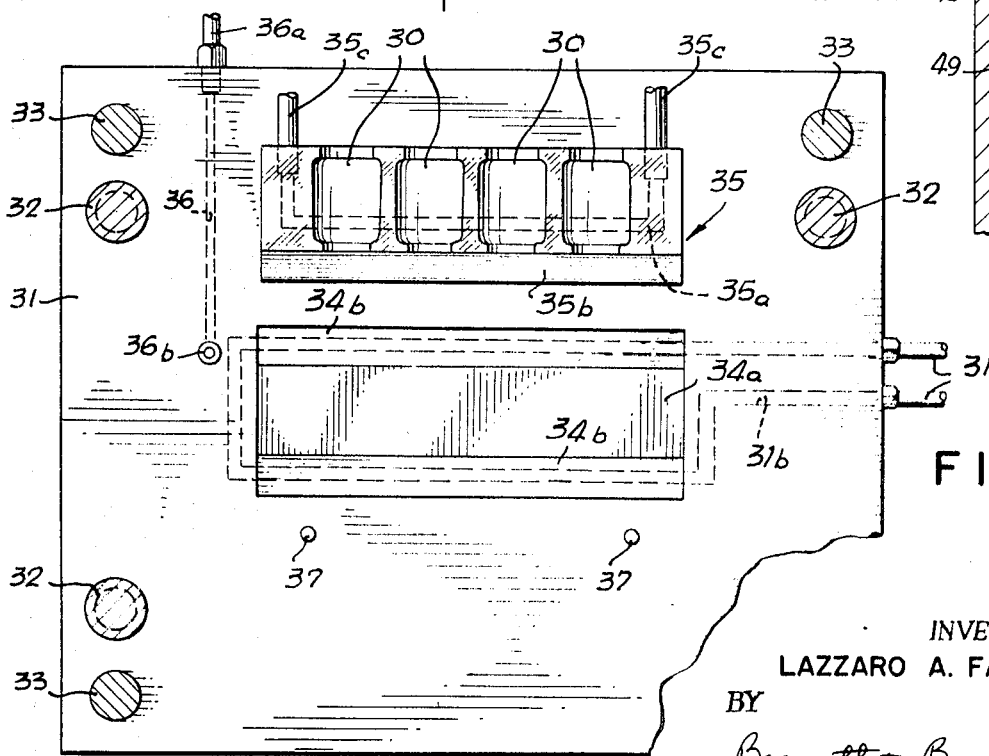

United States Patent Office 3,609,803
Patented Oct. 5, 1971

3,609,803
APPARATUS FOR MANUFACTURING PLASTIC
BOTTLES BY INJECTION AND BLOW MOLDING
Lazzaro A. Fattori, 84 Rose Ave.,
Woodcliff Lake, N.J. 07675
Filed Apr. 8, 1968, Ser. No. 719,384
Int. Cl. B29d 23/03
U.S. Cl. 18—5
11 Claims

ABSTRACT OF THE DISCLOSURE

Plastic bottles are manufactured in four steps of injection molding a parison, blowing the bottle, cooling, and ejecting the blown bottle performed simultaneously at respective stations located at 90° intervals about a circle. Multiple parison cores are carried on a turret in four longitudinal rows radiating in right angular relation about an axis of rotation to register with each of the stations. A three part mold contains the four stations and includes an intermediate mold member supporting the turret for rotation when the mold is open on an axis perpendicular to the axis of mold opening and closing. To satisfy requirements for neck ringsmolded to close tolerances, neck ring molds may be provided at the base of the parison cores which retain the molded neck rings during the blowing and cooling steps. Temperature control is simplified by a controlled temperature gradient established between the turret and the molds at the blowing and cooling stations.

BACKGROUND OF THE INVENTION (1) Field of the invention

The invention relates generally to the art of manufacturing bottles from thermoplastic material by injection molding a parison and then blowing a bottle and more particularly is directed to the method and apparatus utilizing a four step cycle including a cooling step which is particularly adaptable to the manufacture of bottles having threaded or otherwise specially formed neck rings requiring close tolerances.

(2) Description of the prior art

The invention satisfies a need for a highly efficient, relatively inexpensive apparatus for the manufacture of plastic bottles whereby conventional injection molding equipment may be converted with relative ease and inexpensively into an apparatus for blow molding such plastic bottles. There is also a need for blow molding plastic bottles having threaded or otherwise specially formed necks requiring close tolerances, particularly in relatively small sizes, for example, 1 to 3 ozs. where unit cost is highly competitive and where the market is relatively large and is now dominated by glass containers with their obvious disadvantages of weight and breakage. A further need exists for eliminating both the inefficient and costly loss of manufacturing time due to idleness of the injection mold during cooling periods and the adverse effects on the close tolerance requirements by insufficient cooling of the neck prior to ejection from the neck ring mold.

SUMMARY OF THE INVENTION

Among the objects of the invention is to provide a novel method and mold construction for injection and blow molding holloware which satisfy the needs hereinbefore stated.

The method in its broad aspect comprises the four step cycle of (1) injection molding a parison on a core, (2) blowing a bottle about the core, (3) cooling the blown bottle while on the core, and (4) ejecting the bottle from the core preparatory to recycling the core. More specifically, the improved method is performed within the bounds of a three part mold incorporation in equipment having a conventional injection molding capability or adapted to be mounted on the fixed and movable platens of conventional injection molding machines.

The three part mold comprises a floating mold member between a fixed and a movable mold member all separable from each other along an axis of mold reciprocation. A center portion of the floating member is cut out and has a turret mounted therein for rotation on an axis perpendicular to the axis of mold reciprocation. A row or set of parison molding cores is carried on each of four sides of the turret so that each set is advanced in sequence through the four stations which also operate simultaneously and are confined within the three part mold.

At the first or injection molding station, on the closing of the mold, the parisons are injection molded about the cores. As the three part mold opens at the end of the injection molding period, the floating member carrying the turret and cores separates from the fixed and movable members so that the parisons formed on the cores which extend parallel to the axis of mold reciprocation are drawn out of the female mold cavity to clear the fixed member.

The turret is now rotated 90°, positioning the molded parisons in the plane of the floating member which is the second or blowing station. The fixed and movable mold members each mounts one half of a split blow mold which, when the three part mold closes, are brought together in the cut-out of the floating member to surround each core and parison. While a second set of parisons are being molded at the first station, the parisons at the second station are blown by air admitted through the cores.

Likewise, the blown bottles are then rotated 90° to the third station where additional time is provided for cooling during the simultaneous injection molding of a third set of parisons and the blowing of the second set. At the fourth station ejection of the finished bottles is accomplished by an air blast through the cores.

The transfer of the cores and parisons from station to station is highly simplified by the combination of two basic motions, namely, the reciprocating motion in the opening and closing of the injection mold and the rotary motion of the turret. The novel utilization of these two simple movements eliminates complicated transfer mechanisms and reduces indexing requirements, such indexing being further simplified by a tapered fit between the turret and fixed mold member in the formation of the injection molding cavity. These features materially contribute to the reduction of wear and tear on precision parts and hence keep out-of-service time and maintenance costs to a minimum.

The efficiency and practicality of the method and apparatus is undiminished by the number of units in each set or row on the turret, the number being limited primarily by the size of the bottle and the spacing between the tie rods of the injection molding machine. Since the distance of travel for the same size bottle is the same on both large and small machines, the rate of production on different size machines is directly proportional to the distance between the tie rods.

In order to manufacture bottles having threaded or otherwise specially formed neck rings requiring close tolerances, neck molds of a split type may be carried on the turret to provide neck ring molding cavities surrounding the base of each of the cores. At the first station the neck molds of the first set of cores engage the fixed mold member while the cores project into a female parison molding cavity thereof so that the plastic material flows beyond the parison molding cavity into the neck ring cavity wherein the threads or other special neck formation are injection molded. At the second and third stations, the neck molds engage relatively cool blowing mold and movable mold members to dissipate heat of the molded neck rings by conduction while the neck molds are retained in closed position. At the fourth station the neck molds are opened for release and ejection of the finished bottles.

BRIEF DESCRIPTION OF THE DRAWINGS

FIG. 2 is an elevational view as seen on line 2—2 in FIG. 1 showing the face of the floating mold member and the turret mounted therein.

FIG. 4 is an elevational view as seen on line 4—4 in FIG. 1 showing the face of the movable mold member.

DESCRIPTION OF THE PREFERRED EMBODIMENT

Figure 1:
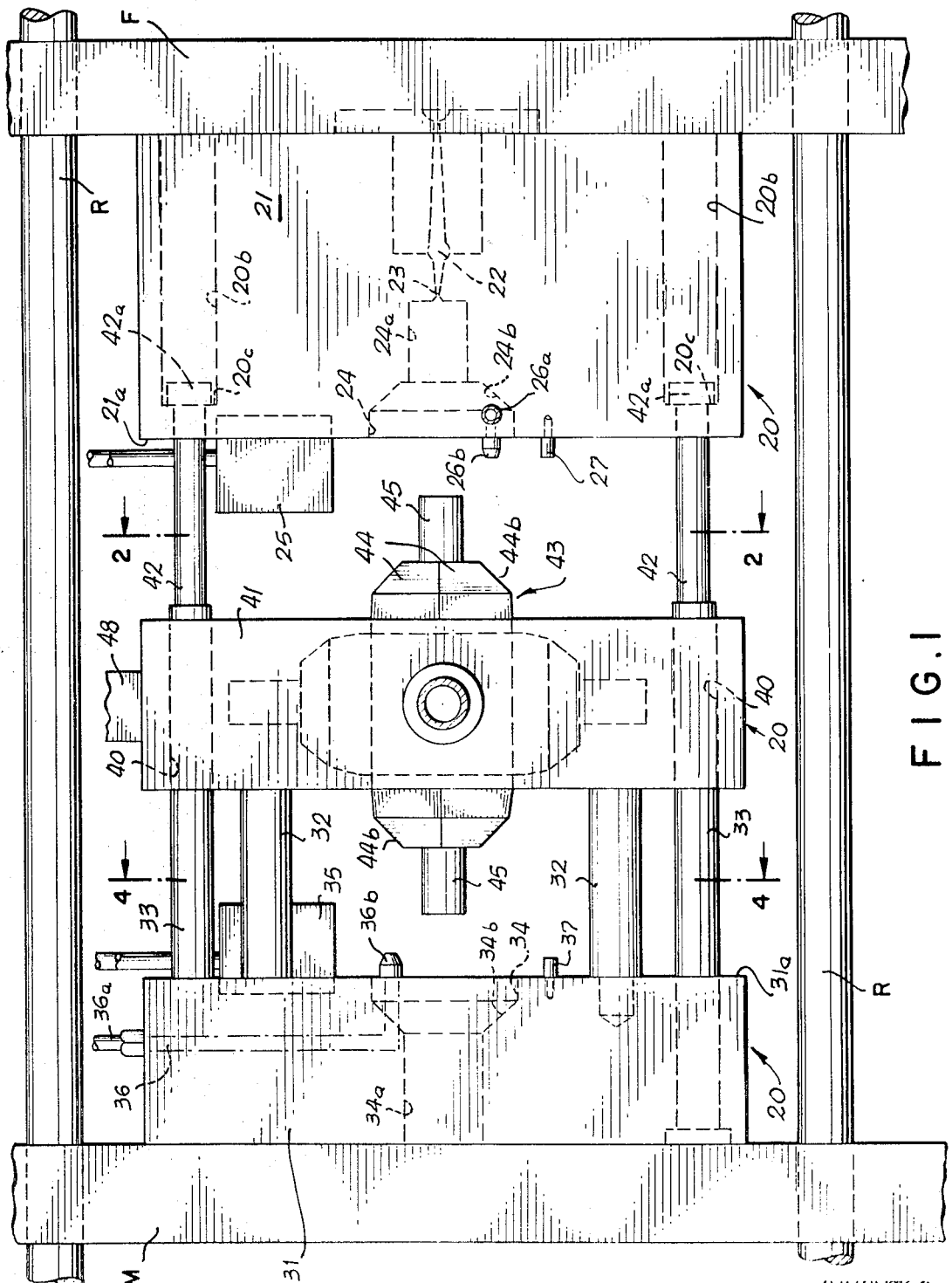
FIG. 1 is a front elevational view of a mold portion of a conventional injection molding machine showing a three part mold constructed to embody the invention in fully open position prior to the apparatus being put into operation.

Referring in detail to the drawings, 20 denotes a three part mold constructed to embody the invention here shown to comprise a fixed mold member 21, a movable mold member 31 and a floating mold member 41. Fixed member 21 and movable member 31 are suitably mounted on fixed platen F and movable platen M, respectively, of a conventional injection molding machine having tie rods R on which movable platen M is reciprocated by conventional means (not shown) to open and close mold 20. Where advisable, as for example, when mold 20 is intially incorporated in a bottle making apparatus, floating mold member 41 may be of sufficient size (not shown) for also mounting on tie rods R. As herein shown, mold members 21 and 31 support floating mold member 41 on four leader pins 33, with two sets of four shoulder bolts 32 and 42 controlling the separation thereof. Leader pins 33 are anchored in movable member 31 and extend through bushings 40 in floating member 41 to be telescopingly received in suitably aligned bushings (not shown) in fixed member 21 when mold 20 is in closed position. One set of shoulder bolts 32 are threaded into movable member 31 and as will be clear from FIGS. 1 and 3, terminate in enlarged heads 32a which telescope into aligned bores 40a and 20a formed in floating member 41 and fixed member 21, respectively, and, as mold 20 opens, abut interior shoulders 40b in bores 40a for separating mold members 41 and 21. The second set of shoulder bolts 42 are threaded into floating member 41 and, as indicated in FIG. 1, terminate in enlarged heads 42a which reciprocate in bores 20b, abutting interior shoulders 20c in bores 20b.

Fixed mold member 21 is formed to receive the molten plastic material from an injection nozzle of the machine (not shown) into a suitable hot runner system 22 for distribution to and injection through a plurality of gates 23 into separate parison mold cavities 24a which comprise the first or injection molding station for the rows of four cores 45 illustrated in FIG. 2. Suitable passageways 22a are provided in close proximity to cavities 24a through which heated oil may be circulated from an exterior source for controlling the temperature of the walls of cavities 24a in the well understood manner.

Movable mold member 31 has an inner cooling cavity 34a which is sized to receive the four blown bottles 50 formed on cores 45 and comprises the third or cooling station housed in movable member 31 and positioned diametrically opposite the injection molding station housed in fixed member 21. Parison mold cavities 24a and cooling cavity 34a open into common recesses 24 and 34 having pairs of sloping opposite walls 24b and 34b, respectively, which serve as angular heels for similar sloping cam surfaces 44b on split neck mold members 44. Split half blow mold members 25 and 35 are seen in FIGS. 1 and 4 to be mounted on fixed and movable members 21 and 31 above recesses 24 and 34 to extend outwardly from parting line surfaces 21a and 31a, respectively. When mold 20 closes, blow mold members 25 and 35 come together in cut-out 40c formed in floating mold member 41 and enclose the row of cores 45 which are aligned in the plane thereof. In this closed position blow mold members 25 and 35, having sloping walls 25b and 35b, respectively, along a lower portion thereof which form an angular heel for similar sloping cam surfaces 44b on split neck mold members 44, provide blow mold cavities 30 which comprise the second or blow molding station.

A feature of the invention is the structure of turret 43 and particularly its mounting in floating mold member 41 for rotation in 90° increments on an axis parallel to parting line surfaces 21a and 31a, that is, perpendicular to the axis of reciprocation of mold members 31 and 41 whereby parison cores 45 are limited to the two simple movements of rotation of turret 43 and reciprocation of mold 20 and all operational stations are confined within mold 20, that is, substantially within the area bounded by the four tie rods R of any conventional injection molding machine.

Turret 43 comprises a substantially tetragonal prism shaped block 43a having the four longitudinal edges cut back to form reentrant corners providing access to a plurality of spaced apart transversely extending undercut keyways 43c formed in each face thereof. Opposite ends of block 43a carry forwardly and rearwardly extending stub shafts 43d and 43e journaled in bearings 40d and 40e, respectively, for rotation of turret 43 in a suitably centralized cut-out 40c formed in floating mold member 41.

A row of equally spaced parison cores 45 are located along a midline on each of the four faces of block 43 to register with cavities 24a and 30, the number of cores 45, namely, four, shown in each row being arbitrarily chosen to illustrate a row. In practice a row may consist of one or more cores 45 with a corresponding number of cavities 24a and 30, the actual number being determined by such variables as size and shape of the bottles being molded, area of the mold being used and injection capacity of the machine.

Figure 3:
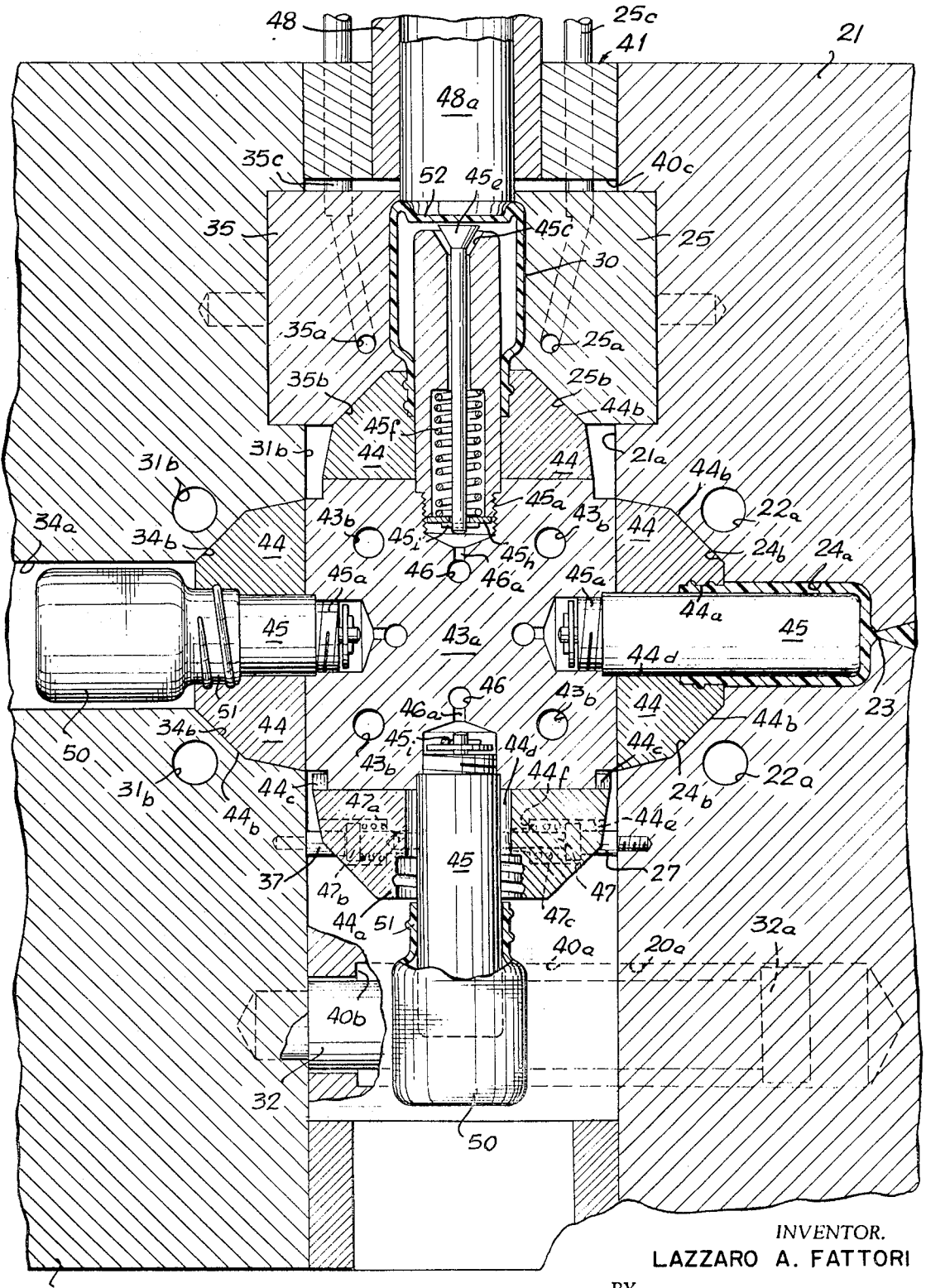
FIG. 3 is an enlarged sectional view taken substantially on the line 3—3 in FIG. 2 but showing the mold closed and at the end of an injection interval just prior to opening.

Each core 45 is seen in FIG. 3 to have a threaded base 45a for mounting in block 43 and an axial bore 45b communicating at the base end with a branch 46a of its corresponding air passageway 46. Each axial bore 45b terminates at the free end thereof in a valve seat 45c. A stem valve 45d extends through bore 45b and has a head 45e which is normally urged to engage valve seat 45c in closed position by compression spring 45f acting between interior shoulder 45g in bore 45b and a washer 45h. The latter, loosely fitting about the stem of valve 45d of otherwise fashioned to permit the flow of air into bore 45b, is retained on the stem by pin 45i and is sized to abut the bottom edge of threaded base 45a for limiting the extent of opening of valve 45d. Air, supplied through passageway 46 in proper timed relation in the manner hereinafter more fully described, is under sufficient pressure to overcome compression spring 45f for opening the valve to blow or eject the bottle.

Each face of block 43a has a pair of longitudinally extending split neck mold members 44 mounted on opposite sides of the row of cores 45. Movable mounting is provided by transverse tracks 44c projecting from the bottom of each member 44 shaped and positioned to engage keyways 43c, permitting sliding lateral movement of the pair of members 44 from a normally closed parting line abutment to an open spaced apart position shown in FIG. 3 at the fourth or ejection station. The parting line abutment surfaces of each member 44 has a semicircular recess 44d for closing against the base portion of each core 45, recesses 44d widening into neck mold cavities 44a which open into and become coextensive with parison mold cavities 24a when cores 45 are at the first station. Two or more pairs of shoulder bolts 47 may be utilized to retain each pair of neck mold members 44 in closed position and also serve as elements of a neck mold separation device. As here shown, one pair of shoulder bolts 47 are provided adjacent each end of members 44, but additional pairs may be used at spaced intervals therebetween when required. Each shoulder bolt 47 of the pair extends through a transverse bore 44e in one of the mold members 44 offset from the other and attaches by threaded end 47a to the other of the mold members 44. The action of compression springs 47c mounted on shoulder bolts 47 between enlarged bolt heads 47b and interior shoulders 44f of transverse bores 44e serve to retain mold members 44 in a normally closed abutment relation.

Striker pins 27 and 37, as the companion elements of the neck mold separation device, are mounted on fixed and movable mold members 21 and 31 to project beyond parting line surfaces 21a and 31a, respectively, and are located and aligned to engage those pairs of bolt heads 47b of the pair of neck ring mold members 44 located at the fourth station. As mold 20 closes, striker pins 27 and 37 engage their respective bolt heads 47b and move the shoulder bolts 47 against the action of compression springs 47c thereby sliding neck mold members 44 apart along keyways 43c to release the molded neck rings 51 permitting ejection of blown bottles 50 from cores 45 as shown in FIG. 3.

Where it is desired that bottles 50 have a concave bottom 52, a cam cylinder mechanism 48 may be mounted on the top surface of floating mold member 41 having a concave bottom shaping cam 48a mounted for reciprocation into each blow mold cavity 30. Cams 48a may be actuated by conventional air cylinder means (not shown) in timed relation with the opening and closing of mold 20.

An air pressure supply system for blowing bottles at the second station and ejecting blown bottles 50 at the fourth station generally comprises air ducts 26 and 36 and four separate air passageways 46. Each passageway 46 through its branches 46a serve one row of cores 45 on one of the four faces of turret 43. Air ducts 26 and 36 are formed in fixed mold member 21 and movable mold member 31 and terminate in nozzles 26b and 36b which project beyond parting line surfaces 21a and 31a, respectively. Each passageway 46, in supplying air to the cores 45 located on one of the four faces of turret 43, has an angular bend to locate its inlet end to open on an adjacent face of turret 43. Each inlet end is formed as a seat 46b which is sized and located to alternately engage nozzles 26b and 36b. Air supply ducts 26 and 36 receive compressed air through supply hoses 26a and 36a, respectively, from a supply source (not shown) in proper timed relation as hereinafter more fully described. As will be clear from FIG. 5, the air passageway 46 serving the row of cores 45 located at the second station for the blowing operation has its inlet end seat 46b located for engagement by nozzle 36b upon the closing of mold 20 to receive air through duct 36 and supply hose 36a. Likewise, the air passageway 46 serving the row of cores 45 located at the fourth station for ejection of bottles 50 has its inlet end seat 46b located for engagement by nozzle 26b to receive air through duct 26 and supply hose 26a, the two remaining inlet end seats 46b of passageways 46 serving the rows of cores at the first and third stations being free and inactive.

Heating of turret block 43a may be accomplished in any suitable manner, herein shown as similar to that hereinbefore described for heating fixed mold member 21, namely, by the circulation of heated oil from a temperature controlled source (not shown). For this purpose, turret block 43a has four longitudinal spaced passageways 43b branching from bores 43f and 43g provided in stub shafts 43d and 43e, respectively, stub shaft 43d terminating in a fitting connecting to a hose line 43h to the heated oil source. A return hose line (not shown) connects to the end of stub shaft 43e.

Cooling is accomplished by circulation of a suitable cooling liquid, such as water from a temperature controlled source, through passageways 25a, 35a in blow mold members 25, 35 respectively, and through passageway 31b in movable mold member 31, passageways 25a, 35a and 31b terminating at opposite ends in suitable connections with supply hoses 25c, 35c and 31c, respectively.

Rotation of turret 43 may be accomplished in proper timed relation by a conventional indexing turntable mechanism located in housing 49a and actuated by air cylinder 49b through air hoses 49c and 49d. Housing 49a and air cylinder 49b may be conveniently mounted on plate 49 which is secured to the rear face of floating mold member 41. The indexing turntable mechanism is suitably connected within housing 49a to rearwardly extending stub shaft 43e for rotating turret 43.

The practical application of the method of manufacture and operation of the apparatus embodying the invention will now be described. Three part mold 20 is mounted on a conventional injection molding machine, the control devices of which are preset for an appropriate injection molding cycle shown in FIG. 6 to be of 8 second duration for illustrative purposes. The actual cycle length and the duration of each step within the injection molding cycle will be determined by the properties of the plastic resin used and the size, configuration, wall thickness, etc. of the article being molded in accordance with well known practice.

One of the features of the invention is the reduction of time loss at the injection station to an absolute minimum. From FIG. 6 it will be apparent that except for the approximate 1½ seconds required for rotating turret 43, the time interval at each station, namely, the 8 seconds of the illustration, is determined by the time requirements for injection molding at the first station. Thus, it is clear that there is no time delay or loss at the first station to permit completion of a blowing, cooling or ejection operation at any of the other stations.

Beginning the description of the operation at the completion of the injection molding and curing of a third row of parisons, at which time a second row of parisons has been blown into a row of bottles 50 at the second station, and a first row of parisons has been blown into a row of bottles 50 cooling at the third station, mold 20 starts opening and retracts the third row of parisons from cavities 24a. Simultaneously, blow mold members 25 and 35 separate and the row of cooled bottles 50 are withdrawn from cooling cavity 34a. As will be clear from FIG. 6, prior to mold 20 reaching its full open position, cam cylinder mechanism 48 retracts cams 48a to release blown bottles 50 at the second station for rotation to the third station. Retraction of cams 48a may be accomplished by any conventional means provided on the injection molding machine for such cam operation, as for example, by an air cylinder (not shown) which operates cam cylinder mechanism 48 under the control of a four-way valve energized through the conventional mold opening and mold closing relays of the machine.

At the fully open position of mold 20, a microswitch (not shown), which is an element of the control for the indexing turntable mechanism in housing 49a, energizes a solenoid actuated four-way valve (not shown) to deliver air pressure through hose 49c advancing a piston in air cylinder 49b to rotate turret 43 through 90°, return of the piston for the next cycle being automatically accomplished by conventional means incorporated in the turntable control. After a conventional short dwell period here shown to be of ½ second duration, closing of mold 20 is initiated at time 0 shown in FIG. 6 by the closing relay of the machine which also actuates the four-way valve of the cam cylinder mechanism 48 to extend cams 48a into blow mold cavities 30 which are formed by the closing of mold 20 around the row of cores 45 bearing the newly molded parisons which were just rotated into the plane of floating mold member 41.

As mold 20 closes, exact alignment of turret 43 is accomplished by engagement of the cam surfaces 44b of split neck mold members 44 with sloping opposite walls 24b and 34b of common recesses 24 and 34, respectively. This arrangement is a self-aligning feature which eliminates any requirement for close tolerance indexing by the turntable mechanism and the accompanying adjustment, wear and maintenance problems. The engagement of cam surfaces 44b with sloping opposite walls 24b, and 25b, 35b and 34b at the first, second and third stations also maintains split neck mold members 44 in tightly closed position during the molding, blowing and cooling periods.

Figure 5:
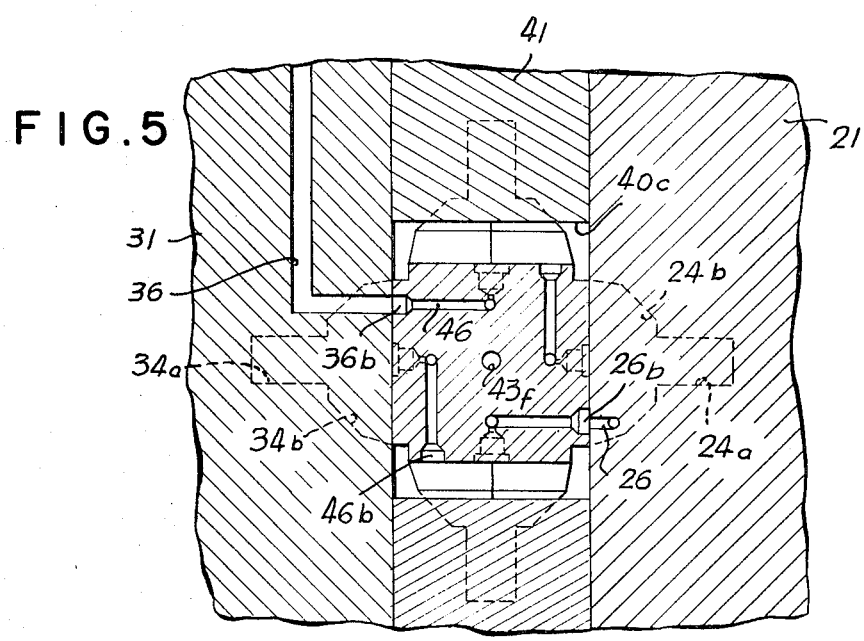
FIG. 5 is a fragmentary sectional view taken on line 5—5 in FIG. 2, but with the mold closed, showing interior duct portions of the air pressure supply system for blowing and ejecting the bottles.

At time 1 second, mold 20 is substantially closed, bringing nozzles 36b and 26b to engage seats 46b and complete the air conduit from air supply hoses 36a and 26a through appropriate passageways 46 and branches 46a in turret block 43a to the axial bores 45b of the cores 45 located at the second and fourth station, respectively, as shown in FIG. 5, and bringing striker pins 27 and 37 into engagement with heads 47b of shoulder bolts 47 to force the pair of split mold members 44 apart against the action of springs 47c and release the neck rings 51 of the bottles 50 located at the fourth station, as will be clear from FIG. 3. Simultaneously, mold 20 actuates a microswitch (not shown) for energizing the intensifier relay (not shown) of the injection molding machine to initiate the application of the intensifying pressure preparatory to the injection of molten resin at the first station in the well known manner. The intensifier relay is also electrically wired to simultaneously energize first and second solenoid operated two-way valves (not shown) which supply air pressure to hoses 36a and 26a, respectively, from the compressed air source.

Thus, while the parisons are being molded at the first station, compressed air is supplied through stem valves 45d, which open under pressure, to blow the parisons into bottles 50 at the second station and eject the finished product from cores 45 at the fourth station, the blown bottles 50 and their molded neck rings 51 being held firmly by neck mold members 44 for proper cooling and setting at the third station.

Figure 6:
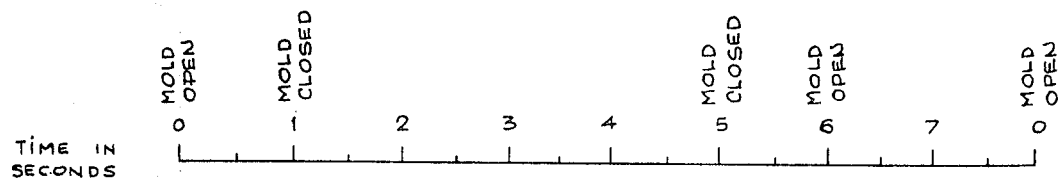
FIG. 6 is a diagram illustrating the operations occurring simultaneously at each of the four stations during one complete cycle.

As will be clear from FIG. 6, air pressure through hose 26a to the ejection station may be limited in time to cutoff the air after ejection is accomplished thereby conserving the supply thereof. The ejection air pressure time, herein shown as about 1½ seconds, may be varied to meet requirements by means of a conventional timer (not shown) which controls a switch (not shown) interposed in the energizing circuit from the intensifier relay to the second solenoid operated two-way valve.

The method features a novel but simple provision for temperature control of cores 45 and neck ring mold members 44 which relies on a temperature gradient being established between turret block 43a and blow mold members 25 and 35 at the second station and movable mold member 31 at the third station, whereby split neck mold members 44, having a maximum temperature at the first station, reach a minimum temperature at the third station, and begin to increase in temperature upon leaving the third station to again reach a maximum upon return to the first station.

Heat is applied to fixed mold member 21 and turret block 43a by the heated oil circulating in passageways 22a and 43b, respectively. The temperature of the heated oil, which is thermostatically controlled at its supply source, is predetermined for the particular resin being molded to provide the temperature requirements for the proper flow of the molten plastic resin into the mold cavities 24a and 44a at the first station without stress during injection, for proper curing in the mold, for retraction of the molded parisons from mold cavities 24a and for providing proper consistency of the parisons for blowing after transfer to the second station. The heat being applied to turret block 43a by the heated oil is withdrawn from blow mold members 25, 35 and movable mold 31 by the cooled water circulating in passageways 25a, 35a and 31b, respectively, establishing the desired temperature gradient meeting the cooling requirements of blown bottles 50 and molded neck rings 51.

Thus, as will be clear from FIG. 3, heat passes by conduction from turret block 43a into cores 45 and split neck mold members 44. At the first station this heat is utilized in cooperation with that supplied to fixed mold member 21 to provide a relatively elevated temperature for the requirements as hereinbefore described. During the time interval of approximately four seconds from the completion of the injection and curing of the parisons at the first station at time 5 seconds to the beginning of the blowing operation at time 1 second of the succeeding cycle, as shown in FIG. 6, the parisons are in contact with and are heated by cores 45 to prevent a drop in temperature below that required for blowing. At the second station the rate of dissipation of heat from cores 45 and neck mold members 44 increases, particularly with respect to the latter which are in contact with cooled sloping walls 25b, 35b for heat conduction thereto, blown bottles 50, being cooled to a form retaining temperature by contact with the cooled walls of molds 30. At the third station contact with sloping walls 34b further reduces by conduction the temperature of neck mold members 44 to complete the curing of neck rings 51 providing the desired close tolerances therein. At the fourth station the temperature of cores 45 which is relatively higher than that of neck mold members 44 because the latter have been subjected to a greater heat loss by conduction at the third station, is proper for aiding ejection of bottles 50 which are in contact with cores 45 along the interior surface of neck rings 51. As soon as ejection is complete and the compressed air to cores 45 is cut off, the temperature of the latter and of neck mold members 44 begins to rise, since the heat dissipation at the fourth station is only by radiation which is slower than by the conduction at the second and third stations.

It is understood, that where conditions require, as for example, where the wall of bottles 50 are relatively thick or where split neck molds 44 are not utilized, an atmosphere of relatively low temperature may be provided in cooling cavity 34a, as by jets of refrigerated air (not shown) to increase the heat dissipation from bottles 50 by radiation to sufficiently rigidify bottles 50 at the end of the cooling period preparatory to ejection at the fourth station.

Cooling liquid supplied through hoses 25c, 35c to cool blow mold members 25, 35 and that supplied through hoses 31c to cool the surrounding mold structure of cooling cavity 34a may be supplied at the same or at different temperatures readily controllable at the source and/or circulated at the same or different rates in accordance with the heat dissipation requirements at the respective stations.

The improved method and apparatus herein disclosed are seen to achieve the several objects of the invention and to be well adapted to meet conditions of practical use. As various possible embodiments might be made in this invention, and as various changes might be made in the disclosed method and construction, it is to be undertood that all matters herein set forth or shown in the accompanying drawing are to be interpreted as illustrative and not in a limiting sense.

I claim:

1. An apparatus for injection-blow molding thermoplastic material into hollow articles, a three part mold comprising a fixed and movable mold member and an intermediate mold member therebetween, said mold members being separable from each other from a closed to an open position by movement along an axis of reciprocation of said movable mold member, injection molding, blowing, cooling, and ejection stations being constructed and arranged within the three part mold at right angles to each other, a turret mounted in said intermediate mold member for rotation on an axis perpendicular to said axis of reciprocation when the mold is in open position, and a core mounted on said turret extending radially with respect to said axis of rotation into each of said four stations when the mold is in closed position.

2. The apparatus defined in claim 1 in which a plurality of cores are spaced from each other in rows extending along said axis of rotation, said stations being formed to accommodate the number of cores in each of said rows.

3. The apparatus defined in claim 1 in which the blowing and ejection stations are located opposite each other in said intermediate mold member, air ducts formed in said fixed and movable mold members terminating in coupling elements located at parting lines with said intermediate member, each of said cores having valved bores for delivering compressed air therethrough for the blowing and ejection at the respective stations, an air passageway symmetrically connecting each of said valved bores with a companion coupling element located to engage one or the other of the coupling elements when the respective core is in the blowing or ejection station.

4. The apparatus defined in claim 1 in which a normally closed pair of split neck mold members are mounted on said turret at the base of each of said cores, and means on said movable and fixed mold members for separating the neck mold members located at the ejection station when the mold is in closed position.

5. The apparatus defined in claim 1 in which a normally closed pair of split neck mold members are mounted on said turret at the base of each of said cores, a split half blow mold member carried on each of said fixed and movable molds adapted to meet in a cutout formed in said intermediate mold member and surround the core at the blowing station when the mold is closed, said split neck mold having surfaces for engaging companion surfaces formed on each of said fixed mold, blow mold, and movable mold members retaining the split neck mold members in closed position when the three part mold is closed.

6. The apparatus defined in claim 5, means for heating said turret at a controlled rate to heat the cores and neck mold members by conduction therefrom, means for cooling said blow mold and movable mold members at a controlled rate, said engagement between the split neck mold surfaces and companion surfaces of the blow mold and movable mold members providing conduction means for dissipating heat to effect cooling of the neck mold members at the blowing and cooling stations.

7. The apparatus defined in claim 2 in which a normally closed pair of split neck mold members are mounted on said turret at the base of each of said rows of cores to separate along the center line of the row, a split half blow mold member carried on each of said fixed and movable molds adapted to meet in a cutout formed in said intermediate mold member and surround the core at the blowing station when the mold is closed, said split neck mold having opposite beveled surfaces engaging companion surfaces formed on each of said fixed mold, blow mold, and movable mold members for retaining the split neck mold members in closed position when the three part mold is closed, means for heating said turret at a controlled rate to heat the cores and split neck mold members by conduction therefrom, means for cooling said blow mold and movable mold members at a controlled rate, said engagement between the split neck mold beveled surfaces and companion surfaces providing conduction means for dissipating heat to effect cooling of the neck mold members at the blowing and cooling stations, and means on said movable and fixed mold members for separating the neck mold members located at the ejection station when the mold is in closed position.

8. The apparatus defined in claim 1, a split half blow mold member carried on each of said fixed and movable mold members adapted to meet in a cutout formed in said intermediate mold member and surround the core at the blowing station when the mold is closed, means for heating said turret at a controlled rate to heat the cores by conduction therefrom, means for cooling said blow mold and movable mold members at a controlled rate, said heating means including passageways through said turret for circulation of temperature controlled heated oil therethrough.

9. The apparatus defined in claim 1 in which the injection molding station includes an injection molding cavity formed in the fixed mold member and the parison is molded on the core extending axially into the cavity parallel to said axis of reciprocation for axial withdrawal of the molded parison therefrom when the mold opens.

10. An apparatus for injection-blow molding thermoplastic material into hollow articles comprising means located in right angular relation about a circle for simultaneously molding a parison on a core, blowing the molded parison on the core into a hollow article, cooling the molded hollow article on the core, and ejecting the molded and cooled article from the core, a turret mounted for rotation on an axis centralized with respect to said circle, cores radiating from said turret for engagement with said molding, blowing, cooling and ejecting means, moving means for disengaging said cores from said molding, blowing, cooling and ejecting means for advancement of the cores to the next means by rotation of the turret, and means for rotating the turret in timed relation to said moving means, the latter moving said turret along a path perpendicular to said axis of rotation.

11. The apparatus defined in claim 10 in which said hollow articles have molded neck rings, a normally closed pair of split neck mold members mounted on said turret at the base of each of said cores for molding the neck ring on the parison in cooperation with said parison molding means and for retaining the neck therein during blowing and cooling of the bottle on the core to insure a neck ring having dimensions to relatively close tolerances.

References Cited
UNITED STATES PATENTS

| | | | |
|---|---|---|---|
| 2,290,129 | 7/1942 | Moreland et al. | 18—20X |
| 2,715,751 | 8/1955 | Weber | 18—20X |
| 2,789,312 | 4/1957 | Borer | 18—5 |
| 2,853,736 | 9/1958 | Gossoni | 18—5 |
| 3,100,913 | 8/1963 | De Matteo | 18—20 |

J. SPENCER OVERHOLSER, Primary Examiner

M. O. SUTTON, Assistant Examiner

U.S. Cl. X.R.

18—20; 264—97